United States Patent
Thakur et al.

(10) Patent No.: US 10,015,646 B2
(45) Date of Patent: Jul. 3, 2018

(54) GROUP OWNER SELECTION WITHIN A PEER-TO-PEER NETWORK

(71) Applicant: QUALCOMM Incorporated, San Diego, CA (US)

(72) Inventors: Sidharth Ram Thakur, San Jose, CA (US); Stephen Craig Collmeyer, Campbell, CA (US)

(73) Assignee: QUALCOMM Incorporated, San Diego, CA (US)

(*) Notice: Subject to any disclaimer, the term of this patent is extended or adjusted under 35 U.S.C. 154(b) by 153 days.

(21) Appl. No.: 14/678,832

(22) Filed: Apr. 3, 2015

(65) Prior Publication Data

US 2016/0094958 A1    Mar. 31, 2016

Related U.S. Application Data

(60) Provisional application No. 62/055,987, filed on Sep. 26, 2014.

(51) Int. Cl.
| | | |
|---|---|---|
| *H04W 4/08* | (2009.01) | |
| *H04W 4/20* | (2018.01) | |
| *H04W 8/00* | (2009.01) | |
| *H04W 76/14* | (2018.01) | |
| *H04W 84/20* | (2009.01) | |

(Continued)

(52) U.S. Cl.
CPC ........... *H04W 4/08* (2013.01); *H04L 67/1051* (2013.01); *H04W 4/203* (2013.01); *H04W 76/023* (2013.01); *H04W 76/14* (2018.02); *H04W 84/20* (2013.01); *H04W 8/005* (2013.01)

(58) Field of Classification Search
CPC ....... H04W 4/08; H04W 4/203; H04W 8/005; H04W 76/023; H04W 84/20; H04L 67/1051
See application file for complete search history.

(56) References Cited

U.S. PATENT DOCUMENTS

| | | | |
|---|---|---|---|
| 2011/0015765 A1* | 1/2011 | Haughay, Jr. ......... | G06T 13/205 700/94 |
| 2011/0093536 A1 | 4/2011 | Wentink | |

(Continued)

FOREIGN PATENT DOCUMENTS

EP    2731368 A1    5/2014

OTHER PUBLICATIONS

International Search Report and Written Opinion—PCT/US2015/047772—ISA/EPO—Nov. 27, 2015.

(Continued)

*Primary Examiner* — Lonnie V Sweet
(74) *Attorney, Agent, or Firm* — Paradice and Li LLP/Qualcomm (57) ABSTRACT

A method of selecting one of a number of wireless devices to be a group owner of a peer-to-peer network includes determining, at a first wireless device, a first count value indicating how many other wireless devices are within wireless communication range of the first wireless device; determining, for a second wireless device, a second count value indicating how many other wireless devices are within wireless communication range of the second wireless device; and selecting either the first wireless device or the second wireless device as the group owner based, at least in part, on whether the first count value is greater or less than the second count value.

23 Claims, 6 Drawing Sheets

(51) Int. Cl.
  *H04W 76/02* (2009.01)
  *H04L 29/08* (2006.01)

(56) References Cited

U.S. PATENT DOCUMENTS

| | | |
|---|---|---|
| 2011/0225305 A1 | 9/2011 | Vedantham et al. |
| 2012/0278389 A1 | 11/2012 | Thangadorai |
| 2013/0045678 A1 | 2/2013 | Lee |
| 2013/0132500 A1 | 5/2013 | Vandwalle et al. |
| 2014/0078928 A1* | 3/2014 | Verma .................. H04W 84/20 370/254 |
| 2014/0206285 A1* | 7/2014 | Jance ................. H04W 76/025 455/41.2 |
| 2014/0206407 A1* | 7/2014 | Kim ..................... H04W 8/005 455/515 |
| 2015/0043484 A1* | 2/2015 | Jung .................. H04W 76/023 370/329 |

OTHER PUBLICATIONS

Shahin Ahmed A., et al., "A Framework for P2P Networking of Smart Devices Using Wi-Fi Direct", 2014 IEEE 25th Annual International Symposium on Personal, Indoor, and Mobile Radio Communication (PIMRC), IEEE, Sep. 2, 2014 (Sep. 2, 2014), pp. 2082-2087, XP032789874, DOI: 10.1109/PIMRC.2014.7136515 [retrieved on Jun. 25, 2015] abstract p. 2082, left-hand column, last paragraph—right-hand column, paragraph 1.
Asadi A., et al., "WiFi Direct and LTE D2D in Action," IEEE IFIP Wireless Days (WD), Nov. 2013, pp. 1-8.

* cited by examiner

GROUP OWNER SELECTION WITHIN A PEER-TO-PEER NETWORK

CROSS-REFERENCE TO RELATED APPLICATION

This application claims priority to U.S. Provisional Patent Application No. 62/055,987 entitled "GROUP OWNER SELECTION WITHIN A PEER-TO-PEER NETWORK" filed Sep. 26, 2014, the entirety of which is incorporated by reference herein.

TECHNICAL FIELD

The present embodiments relate generally to wireless networks, and specifically to group owner selection within a peer-to-peer network.

BACKGROUND OF RELATED ART

A Wi-Fi network may be formed by one or more access points (APs) that provide a wireless communication channel or link with a number of wireless devices such as mobile stations (STAs). Each AP, which may correspond to a Basic Service Set (BSS), periodically broadcasts beacon frames to enable any STAs within wireless range of the AP to establish and/or maintain a communication link with the Wi-Fi network. The beacon frames, which may include a traffic indication map (TIM) indicating whether the AP has queued downlink data for the STAs and the AP's timing synchronization function (TSF) value, are typically broadcast according to a target beacon transmission time (TBTT) schedule.

A peer-to-peer (P2P) network may be formed by a number of STAs without the presence of an AP. For P2P networks operating according to the Wi-Fi Alliance P2P Specification, which is also known as "Wi-Fi Direct," one of the STAs may be designated as the Group Owner (GO), and the other STAs may be designated as P2P clients. The P2P Group Owner may perform many of the functions of an AP such as, for example, broadcasting beacon frames to other STAs in the P2P group. The broadcasted beacon frame may include the Group Owner's TSF value, as well as required operational parameters, supported capabilities, membership, and services available within the P2P Group.

Selecting which of a plurality of STAs will serve as the GO of the P2P group is important because, for example, the GO may control data transmissions from members of the P2P group, and should therefore be able to communicate with the P2P group members.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus of selecting a Group Owner (GO) for a peer-to-peer (P2P) network are disclosed. For an example embodiment, a first wireless device may determine a first count value indicating how many other wireless devices are within wireless communication range of the first wireless device. The first wireless device may then determine, for one or more second wireless devices, one or more second count values each indicating how many other wireless devices are within wireless communication range of a respective one of the one or more second wireless devices. The first wireless device may receive the one or more second count values from the one or more second wireless devices. The first wireless device may then select either the first wireless device or one of the one or more second wireless devices as a group owner of a peer-to-peer network based, at least in part, on whether the first count value is greater or less than the one or more second count values. For example, when the first number is greater than the one or more second count values, then the first wireless device is selected as the GO; when the first number is less than the one or more second count values, then the first wireless device is selected as the GO. When the first number is equal to a greatest of the second count values, then selected of the GO may be based upon (e.g., a comparison) of the MAC addresses of the first and the one or more second wireless devices.

A wireless device may include one or more antennas, a wireless modem including a transceiver to transmit and receive signals through the one or more antennas, one or more processors, and a memory storing one or more programs configured for execution by the one or more processors. The one or more programs include instructions to perform the methods of the example embodiments. Also, a non-transitory computer-readable storage medium provided within the wireless device may store one or more programs configured for execution by one or more processors in a wireless device. The one or more programs may include instructions to perform the methods of the example embodiments.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The example embodiments are described below in the context of a wireless system operating in accordance with one or more aspects of the IEEE 802.11 family of standards. It is to be understood that the example embodiments are equally applicable to other wireless networks (e.g., cellular networks, Bluetooth networks, pico networks, femto networks, satellite networks, and so on), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, the example embodiments may be implemented in wireless networks configured to operate as infrastructure WLAN systems, peer-to-peer (or Independent Basic Service Set) wireless systems, Wi-Fi Direct wireless systems, and/or Hotspots. In addition, although described herein in terms of exchanging data packets between wireless devices, the example embodiments may be applied to the exchange of any data unit, packet, and/or frame between wireless devices. Thus, the term "data packet" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

Further, the terms "sleep state," "doze state," and "power save state" refer to a low-power operating mode in which one or more components of a Wi-Fi enabled device or station are deactivated (e.g., to prolong battery life), and thus the terms "sleep state," "doze state," and "power save state" may be used interchangeably herein. The terms "wireless device" and "station" (or STA) may be used interchangeably herein. In addition, the terms "P2P network" and "P2P group" may both refer to a number of wireless devices that may communicate with each other without a dedicated access point (e.g., according to the Wi-Fi Direct protocols), and thus the terms "P2P network" and "P2P group" may be used interchangeably herein.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1:
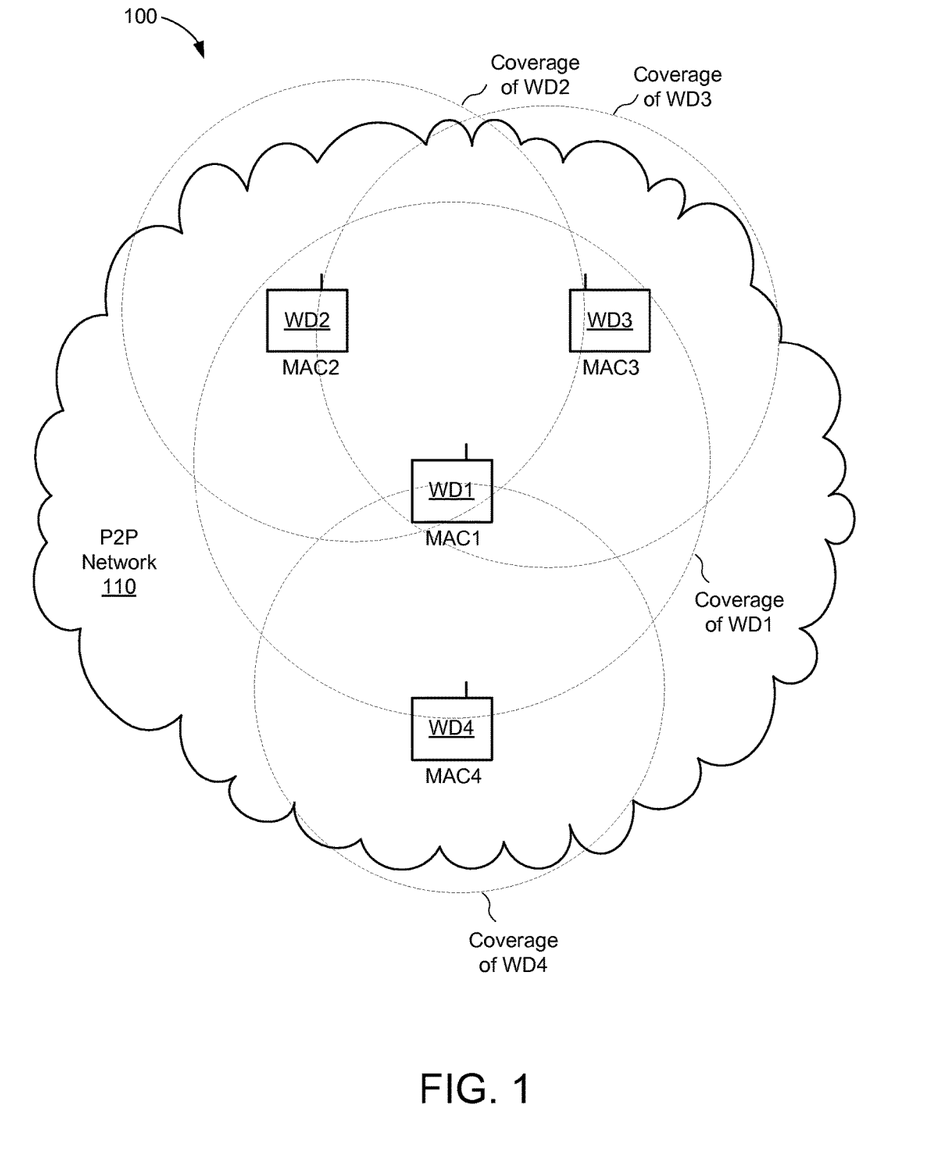
FIG. 1 depicts a network system within which the example embodiments may be implemented.

FIG. 1 depicts an example network system 100 within which the example embodiments may be implemented. The system 100 is shown to include four wireless devices WD1-WD4 that together form a peer-to-peer (P2P) network 110 (or P2P group 110) that may, for example, operate according to the Wi-Fi Direct protocols (although other wireless protocols may be employed to govern the operation of wireless system 100). Although only four wireless devices WD1-WD4 are shown in FIG. 1 for simplicity, it is to be understood that the network system 100 may include any number of wireless devices.

Each of wireless devices WD1-WD4 may be any suitable Wi-Fi enabled wireless device including, for example, cell phones, smartphones, smartwatches, personal digital assistants (PDAs), tablet devices, laptop computers, routers, gateways, hubs, access points, mobile stations (STAs), media players, speakers, audio amplifiers, or the like. Each of wireless devices WD1-WD4 may be assigned a unique media access control (MAC) address (i.e., MAC1-MAC4, respectively) that is programmed therein by, for example, the manufacturer of the wireless device. For at least some embodiments, each of wireless devices WD1-WD4 may include at least one or more transceivers, one or more processing resources (e.g., processors and/or ASICs), one or more memory resources, a display, one or more indicators, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 3 and 4.

Prior to forming a P2P group, the wireless devices WD1-WD4 may perform discovery operations to discover nearby wireless devices and/or to determine what services (e.g., printing) are offered by the nearby devices. The discovery operation may include two phase: a device discovery phase and a service discovery phase. During the device discovery phase, a wireless device determines the identity and/or availability of other wireless devices within Wi-Fi communication range, for example, by scanning the 3 social channels (e.g., channels 1, 6, and 11 in the 2.4 GHz band) for incoming beacon frames and/or by broadcasting probe request frames to any wireless devices that may be listening on those channels. Thereafter, during the service discovery phase, the wireless device queries the available peer devices (e.g., which were discovered during the device discovery phase) about the services they provide.

Once the wireless devices WD1-WD4 discover each other (after which they may be referred to as "peer" devices), the wireless devices WD1-WD4 may select a Group Owner (GO) for the P2P network 110. As mentioned above, the group owner (GO) may perform many of the functions typically associated with an access point (e.g., admitting new members to the P2P group, managing the P2P network, broadcasting beacon frames, and so on). As a result, the GO may also be referred to as a "soft AP." The other peer devices (e.g., those of wireless devices WD1-WD4 not selected as the GO) may be referred to as P2P client devices. The GO may also allow the P2P client devices to connect to a network (e.g., a local area network (LAN), wide area network (WAN), metropolitan area network (MAN), and/or the Internet) using any suitable wired or wireless communication protocol(s). For one example, a GO providing nearby client devices with access to the Internet via the GO's cellular connection to a backhaul network may be commonly known as a "hotspot."

Once the P2P group is formed, the members of the P2P group (e.g., the GO and the client devices) may communicate with each other without the assistance of a traditional access point, thereby allowing a number of wireless devices such as wireless devices WD1-WD4 of FIG. 1 to form a P2P group virtually anywhere. In addition, members of the P2P group may provide (to each other) services including, for example, printing, gaming, file sharing, and/or Internet gateway services.

At present, there are two primary techniques to select a GO for a P2P group. In a first technique commonly known as Autonomous Group Owner selection, a user of a wireless device sets up the users device as the GO. In a second technique commonly known as negotiation-based group creation, a number of candidate wireless devices compete with each other to be selected as the GO. More specifically, each of the candidate wireless devices may compute its own group owner intent value, and then the candidate wireless devices compare their own group owner intent value with the group owner intent values of the other wireless devices: the wireless device having highest group owner intent value becomes the GO, and all other wireless devices become client devices. A wireless device's group owner intent value is typically based upon whether the wireless device is able to perform a cross-connection between an infrastructure WLAN service and a P2P group, remaining power in the wireless device, whether the wireless device is already a group owner in another group, and/or received signal strength indicator (RSSI) values.

Because the GO manages the P2P group and may control when its client devices may transmit data to each other, it is important for the GO to be within wireless communication range of as many of the client devices as possible. Current Wi-Fi Direct protocols do not consider this information when determining group owner intent values. Thus, selecting a GO based on conventional techniques may not result in selecting a GO that is best able to serve the most number of client devices having different physical locations. This is at least one of the technical problems to be solved by the example embodiments.

For example, referring to FIG. 1, although wireless devices WD1-WD4 may all be members of P2P network 110, one or more of wireless devices WD1-WD4 may not be able to communicate with all of the other wireless devices. More specifically, for the example depicted in FIG. 1, the location of wireless device WD2 may allow wireless communication with wireless devices WD1 and WD3 but not with wireless device WD4 (e.g., because wireless device WD4 is not within the wireless coverage area of wireless device WD2); the location of wireless device WD3 may allow wireless communication with wireless devices WD1 and WD2 but not with wireless device WD4 (e.g., because wireless device WD4 is not within the wireless coverage area of wireless device WD3); and the location of wireless device WD4 may allow wireless communications only with wireless device WD1 (e.g., because only wireless device WD1 is within the wireless coverage area of wireless device WD4). However, the central location of wireless device WD1 (e.g., relative to the locations of the other wireless devices WD2-WD4) may allow wireless device WD1 to wirelessly communicate with all other wireless devices WD2-WD4 (e.g., because wireless devices WD2-WD4 are all within the wireless coverage area of wireless device WD1). As a result, wireless device WD1 may be the best candidate for selection of the GO for P2P network 110.

In accordance with the example embodiments, the GO for P2P group 110 may be selected based, at least in part, on how many other wireless devices each of wireless devices WD1-WD4 can wirelessly communicate with. For at least one example embodiment, each of the wireless devices WD1-WD4 may determine how many of the other wireless devices within the P2P network 110 are within wireless range, and may store (e.g., in memory) a counter value or number indicating the number of other wireless devices that are within wireless range. The wireless devices WD1-WD4 may exchange their count values with each other, and then compare the count values with each other to determine which of the wireless devices WD1-WD4 has the greatest count value (e.g., and thus which of the wireless devices WD1-WD4 is able to wirelessly communicate with the greatest number of other wireless devices in the P2P network 110). Thereafter, the wireless device having the greatest count value or number may be selected as the GO for the P2P network 110. For at least one example embodiment, the count value or number may form the basis for the wireless device's group owner intent value.

For other embodiments, the wireless device's group owner intent value may be based upon a combination of the count value and one or more other parameters including, for example, whether the wireless device is able to perform a cross-connection between an infrastructure WLAN service and a P2P group, remaining power in the wireless device, whether the wireless device is already a group owner in another group, and/or received signal strength indicator (RSSI) values. For such other embodiments, the parameters to be considered in determining the group owner intent value may be assigned various weighting values, for example, to place relatively high emphasis on one or more first parameters and/or to place relatively low emphasis on one or more second parameters. In this manner, users of wireless devices WD1-WD4 may dynamically configure and/or adjust how the group owner intent values are determined.

For at least some example embodiments, each of wireless devices WD1-WD4 may determine how many other wireless devices are within wireless range by transmitting a probe request and then listening (e.g., to the wireless channel) to see how many of the other wireless devices respond. More specifically, if another wireless device is within range and receives the probe request, then (per current Wi-Fi protocols) the other wireless device is to respond with a probe response. Thus, if the other wireless device responds with a probe response, then the other wireless device may be deemed to be within wireless range. Conversely, if the other wireless device does not respond with a probe response, then the other wireless device may be deemed to be not within wireless range. Because the headers of probe requests and probe responses include the MAC address of the sending wireless device, a wireless device receiving a probe request and/or a probe response may extract the MAC address of the sending device and thereafter store the MAC address of that wireless device in memory. For some example embodiments, each of wireless devices WD1-WD4 may maintain a list of MAC addresses of wireless devices from which frames (e.g., probe requests and/or probe responds) were received. One or more of wireless devices WD1-WD4 may use its list of MAC addresses to derive the count value or number and/or to determine, at least in part, the wireless device's group owner intent value.

Figure 2:
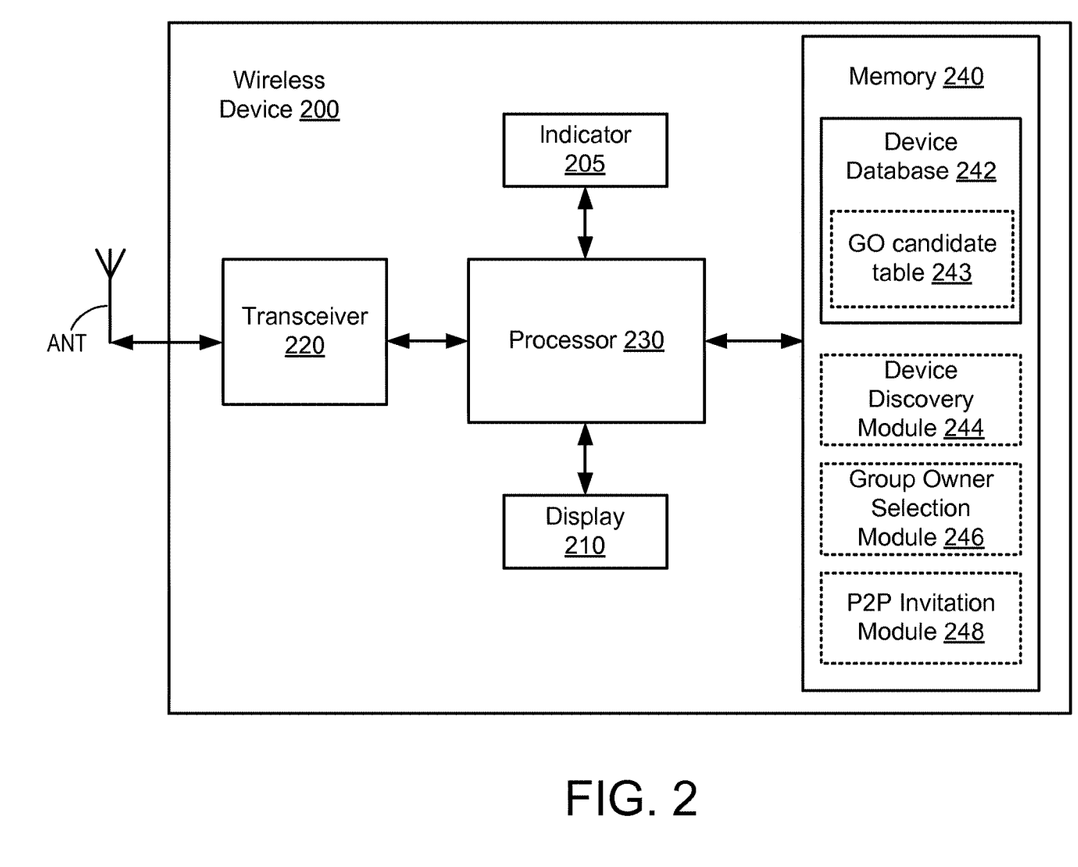
FIG. 2 shows a wireless device that is one embodiment of the wireless devices described in FIG. 1.

FIG. 2 shows a wireless device 200 that is one embodiment of the wireless devices WD1-WD4 of FIG. 1. Wireless device 200 includes an indicator 205, a display 210, at least one transceiver 220, at least one processor 230, a memory 240, and an antenna (ANT). Although only one antenna is shown in FIG. 2, wireless device 200 may include any suitable number of antennas. The indicator 205 may be any suitable indicator (e.g., one or more LEDs) that alerts the user of wireless device 200 to an operating state (or other status) of wireless device 200. The display 210 may be any suitable type of display (e.g., a touch-sensitive display) that provides a user interface for wireless device 200.

The transceiver 220 may be used to transmit signals to and receive signals from other wireless devices. In some embodiments, transceiver 220 may include multiple transceivers to transmit and receive signals within different frequency bands and/or according to different protocols. For example, a first of transceivers 220 may transmit and receive Wi-Fi signals, a second of transceivers 220 may transmit and receive cellular signals, and a third of transceivers 220 may transmit and receive Bluetooth signals. The transceiver 220 may also transmit beacon frames, probe requests, probe responses, discovery messages, action frames, management frames, measurement frames, and/or data frames (and other suitable frames).

Memory 240 may include a device database 242 that may be used as a local cache to store the MAC addresses or other identifying information of a number of other wireless devices. For some embodiments, each MAC address entry in the device database 242 may represent a wireless device that is within wireless communication range of wireless device 200. MAC address entries into device database 242 may be made in conjunction with a P2P discovery operation, as described in more detail below. For at least one embodiment, the device database 242 may also (or alternatively) store the count value or number of wireless device 200 and/or the count values or numbers of other wireless devices that are within wireless range of wireless device 200. In addition, the device database 242 may store the group owner intent value of wireless device 200 and/or the group owner intent values of other wireless devices that are within wireless range of wireless device 200. For at least one example embodiment, device database 242 may also store historical associations (e.g., and corresponding MAC addresses) for other wireless devices that were previously associated with and/or connected to wireless device 200.

In addition, device database 242 may include a group owner candidate table 243 that stores the count values or numbers (or alternately the group owner intent values) of wireless device 200 and all other wireless devices that are within wireless communication range of wireless device 200. For other embodiments, group owner candidate table 243 may be integrated within device database 242.

Further, memory 240 may also include a non-transitory computer-readable storage medium (e.g., one or more non-volatile memory elements, such as EPROM, EEPROM, Flash memory, a hard drive, etc.) that may store the following software modules:
- a device discovery module 244 to determine how many wireless devices may be within communication range of wireless device 200;
- a group owner selection module 246 to select a group owner for the P2P network 110 from a group of candidate wireless devices; and
- a P2P invitation module 248 to invite other wireless devices to join the P2P network 110.

Each software module includes program instructions that, when executed by the processor 230, may cause the wireless device 200 to perform the corresponding function(s). Thus, the non-transitory computer-readable storage medium of memory 240 may include instructions for performing all or a portion of the operations of FIGS. 3, 4A, 4B and 5.

Processor 230, which is coupled to indicator 205, display 210, transceiver 220 and memory 240, may be any suitable one or more processors capable of executing scripts or instructions of one or more software programs stored in the wireless device 200 (e.g., within memory 240). Although shown in FIG. 2 as being coupled between transceiver 220 and memory 240, for actual embodiments, transceiver 220, processor 230, and memory 240 may be connected together using one or more buses (not shown for simplicity).

Processor 230 may execute device discovery module 244 to determine how many other wireless devices are within wireless communication range of wireless device 200 and/or to share this information with other wireless devices. As mentioned above, other wireless devices within communication range of wireless device 200 may be candidates for P2P network 110 and may be a candidate for selection as the GO for P2P network 110. For some embodiments, execution of device discovery module 244 by processor 230 may cause transceiver 220 to broadcast probe requests to other wireless devices and to listen for responses transmitted from the other wireless devices. For example, execution of device discovery module 244 by processor 230 may cause wireless device 200 to transmit a probe request on the wireless medium to elicit responses from nearby wireless devices that are within wireless range of wireless device 200. If another wireless device is within range and receives the probe request, then the other wireless device may send a probe request to wireless device 200. The wireless device 200 may extract the MAC address of the other wireless device from the probe response, and store the MAC address in device database 242. In this manner, the storing of a MAC address in the device database 242 may indicate that the corresponding other wireless device is within wireless range of wireless device 200. For at least one embodiment, device discovery module 244 may increment the count value or number of wireless device 200 when a new MAC address is stored in the device database 242. The device discovery module 244 may decrement the count value or number when a MAC address currently stored in the device database 242 is deleted (or marked invalid), for example, because the corresponding wireless device is no longer within wireless range of wireless device 200. As mentioned above, the number of MAC addresses stored in device database 242 may be used to determine at least part of the group owner intent value of the wireless device 200.

Processor 230 may execute the group owner selection module 246 to select a GO for the P2P network 110 based, at least in part, on the count values or numbers (or alternatively the group owner intent values) of wireless devices that are to form the P2P network 110. For at least some example embodiments, the group owner selection module 246, when executed by processor 230, may compare the count values or numbers of wireless devices WD1-WD4 with each other to determine which of wireless devices WD1-WD4 has the greatest count value or number (and thus which of wireless devices WD1-WD4 is able to wirelessly communicate with the most number of other wireless devices). Thus, for at least one example embodiment, if wireless device 200 has the greatest count value or number (e.g., compared with the count values or numbers for the other wireless devices in the P2P group), then wireless device 200 may select itself as the GO for the P2P group. Conversely, if wireless device 200 does not have the greatest count value or number, then wireless device 200 may designate itself as a client device in the P2P group.

For other example embodiments, each wireless device's group owner intent value may be based upon a combination of the count value and one or more other parameters including, for example, whether the wireless device is able to perform a cross-connection between an infrastructure WLAN service and a P2P group, remaining power in the wireless device, whether the wireless device is already a group owner in another group, and/or received signal strength indicator (RSSI) values.

Processor 230 may execute P2P invitation module 248 to invite other wireless devices to join P2P network 110. P2P invitation module 248 may be executed by processor 230 when wireless device 200 is selected to operate as the GO of P2P network 110. For at least some example embodiments, P2P invitation module 248 may be executed to cause wireless device 200 to send invitation messages (e.g., to join P2P network 110) to wireless devices identified by the MAC addresses stored in device database 242.

Figure 3:
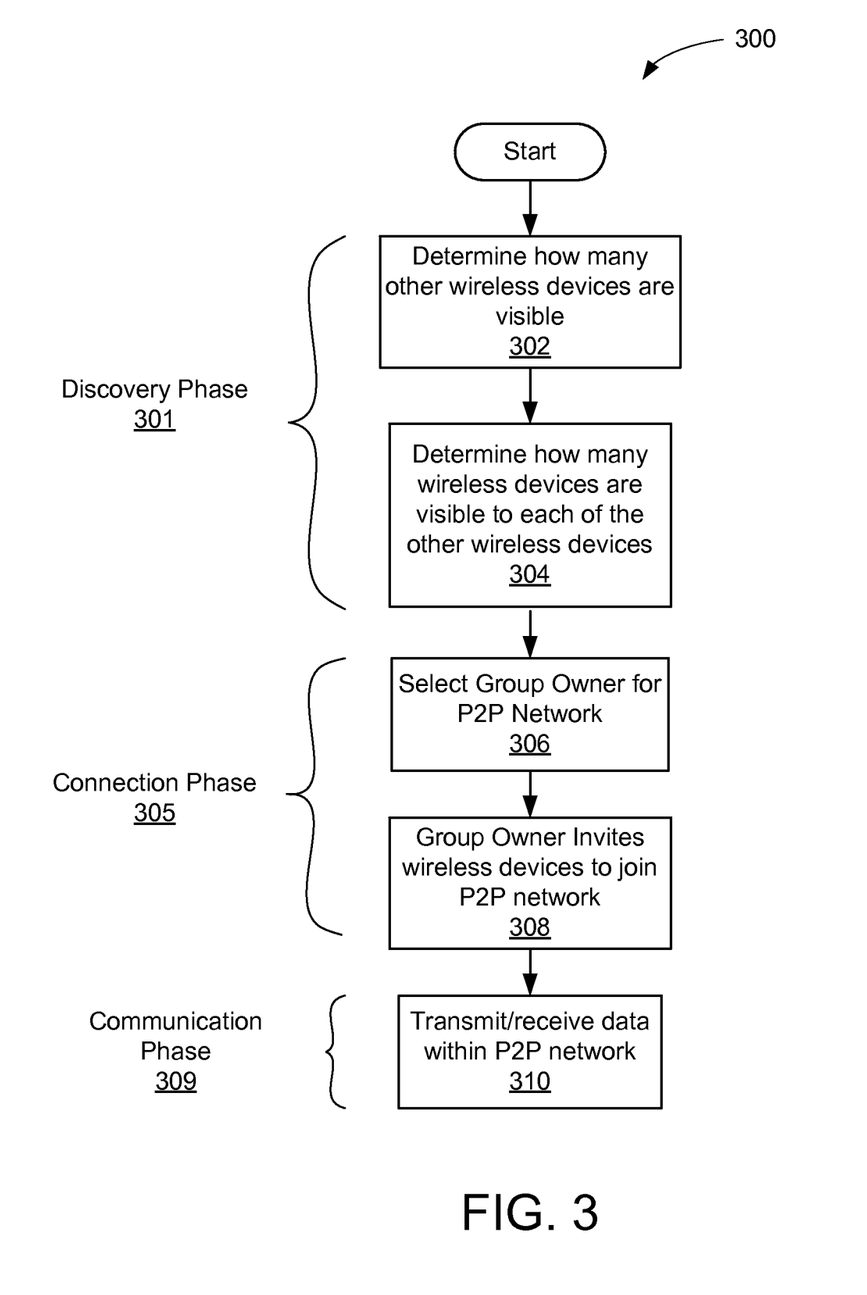
FIG. 3 shows an illustrative flow chart depicting an example operation for operating a P2P network, in accordance with example embodiments.

FIG. 3 shows an illustrative flow chart depicting an example operation 300 for operating P2P network 110, in accordance with example embodiments. Example embodiments may perform the operations described herein with additional operations, fewer operations, operations in a different order, operations in parallel, and/or some operations differently.

Referring to FIGS. 1-3, wireless devices WD1-WD4 may first enter a discovery phase (301). During discovery phase 301, wireless devices WD1-WD4 may discover other nearby wireless devices. In some embodiments, discovery phase 301 may be entered when wireless devices WD1-WD4 receive indication from respective users to begin discovery phase 301. For one example, each of wireless devices WD1-WD4 may detect a button push or any other technically feasible user input. For another example, the wireless devices WD1-WD4 may use "pairing" (e.g., using near field communication (NFC) or Bluetooth signals) to facilitate set-up of the P2P network 110.

During the discovery phase 301, each of wireless devices WD1-WD4 may determine how many other wireless devices are visible (e.g., within its wireless communication range) (302). In some embodiments, each of wireless devices WD1-WD4 may transmit a probe request to the other wireless devices, and then listen for probe responses to determine how many of the other wireless devices are within wireless range. As mentioned above, each probe response includes the MAC address of the responding wireless device, and each of wireless devices WD1-WD4 may compile a list of the MAC addresses of the other wireless devices that are within its wireless range (e.g., using the received probe requests). Each of wireless devices WD1-WD4 may use the resulting list of MAC addresses to determine a count value or number indicating how many other wireless devices are within its wireless range. For at least one example embodiment, the group owner intent value for each of wireless devices WD1-WD4 may be based, at least in part, on the determined count value or number.

While still in the discovery phase 301, each of wireless devices WD1-WD4 may determine how many wireless devices are visible to each of the other wireless devices in the P2P network 110 (304). For example, wireless device WD1 may receive a count value or number (or group owner intent value) from each of the other wireless devices WD2-WD4, for example, during a sharing operation. The sharing operation may utilize any suitable frame(s), and may be performed during the discovery phase 301.

More specifically, the wireless devices WD1-WD4 may share information indicative of their determined count values or numbers with each other during a pre-association service discovery period. Examples of pre-association service discovery protocols include an mDNS (multicast Domain Name System) protocol described by RFC 6267 from the Internet Engineering Task Force, a Bonjour® protocol from Apple® Incorporated, and an Avahi protocol available from GNU Lesser General Public License. In some embodiments, discovery phase 301 may be limited to a predefined time period. For example, operations associated with discovery phase 301 including discovering other wireless devices within communication range and determining the number of wireless devices visible to other wireless devices may be limited to 30 seconds. In other embodiments, other time periods may be used.

Then, during a connection phase 305, the wireless devices WD1-WD4 may form connections with each other and form the P2P network 110. First, a group owner (GO) is selected for P2P network 110 (306). As mentioned above, each of the wireless devices WD1-WD4 may compare their count value or number with the count values or numbers of the other wireless devices to select the GO. The wireless device having the greatest count value or number may be selected as the GO, and all other wireless devices may become client devices. For at least one example embodiment, the wireless devices WD1-WD4 may compare their group owner intent values with other each other, and the wireless device having the greatest group owner intent value may be selected as the GO. For some embodiments, if more than one candidate wireless device has the same count value or number (or the same group owner intent value), then the MAC addresses of the candidate wireless devices may be used as a "tie breaker." For some embodiments, the candidate wireless device having the greatest MAC address may be selected as the GO. For other embodiments, the candidate wireless device having the least MAC address may be selected as the GO.

Then, the GO may invite other wireless devices to join the P2P network 110 (308). In some embodiments, the GO may use a P2P invitation procedure to invite other wireless devices to join the P2P network 110. For example, the GO may transmit a P2P invitation frame to an invitee wireless device. In response thereto, the GO may receive from the invitee wireless device a P2P invitation response frame. In some embodiments, the P2P invitation and response frames may serve as an equivalent to button pushes associated with joining a wireless device to P2P network 110.

Next, the wireless devices WD1-WD4 may enter a communication phase (309). During the communication phase, data and other information may be exchanged between the wireless devices WD1-WD4 within P2P network 110 (310).

For some embodiments, wireless devices WD1-WD4 within P2P network 110 may indicate the operating phase of the wireless device. For example, referring also to FIG. 2, when wireless device 200 enters discovery phase 301, an LED associated with indicator 205 may blink at a first duty cycle. For example, the LED may blink at a 25% duty cycle during discovery phase 301. As wireless device 200 enters connection phase 305, the LED may blink at a second duty cycle. For example, the LED may blink at a 50% duty cycle during connection phase 305. As wireless device 200 enters the communication phase 309, the LED may blink at a third duty cycle, or may stay on continuously. In other embodiments, other duty cycles may be used to indicate different operating phases. In still other embodiments, different LED colors may be used to indicate different operating phases of wireless device 200.

In some embodiments, one or more additional wireless devices may join the P2P network 110 after GO invites other wireless devices at 308. For example, an additional wireless device may detect a button push, and in response to detecting the button push, the additional wireless device may send a request to join the P2P network 110 to the GO. The other wireless devices that are already members of P2P network 110 may not be affected.

Figure 4A:
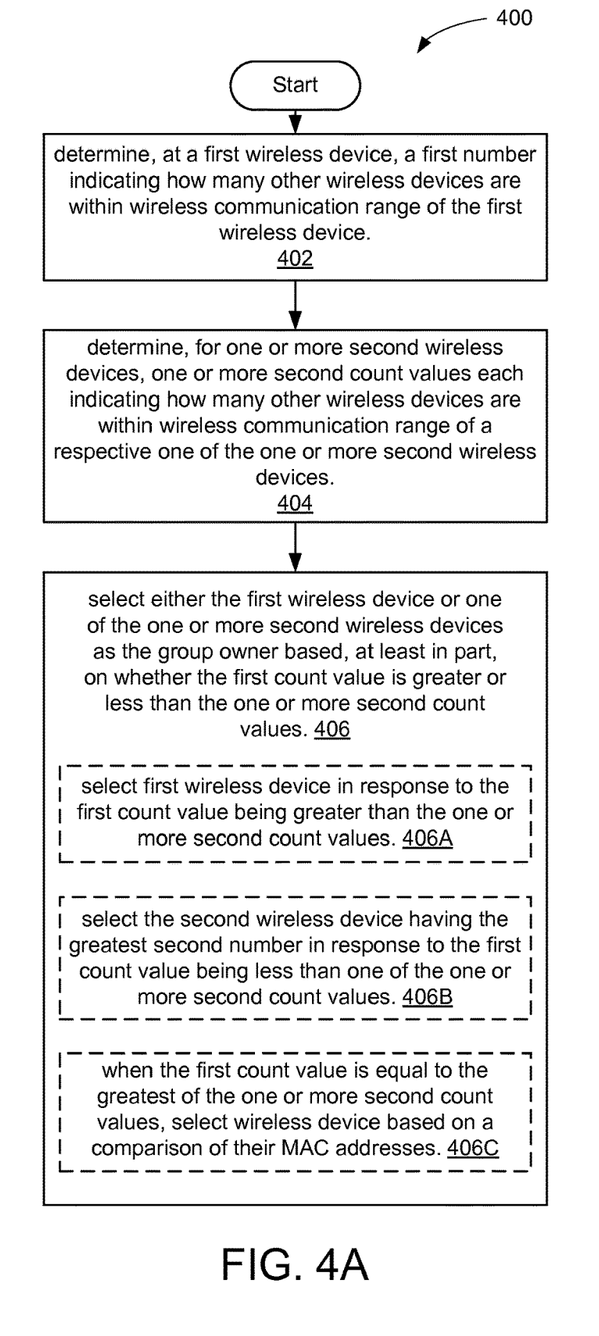
FIG. 4A shows an illustrative flow chart depicting an example operation for selecting a group owner for a P2P network, in accordance with example embodiments.

FIG. 4A shows an illustrative flow chart depicting a more detailed operation 400 for selecting the GO for P2P network 110, in accordance with an example embodiment. Some embodiments may perform the operations described herein with additional operations, fewer operations, operations in a different order, operations in parallel, and/or some operations differently. Further, although the operations of FIG. 4A are described below with respect to wireless device WD1 for simplicity, other wireless devices associated with P2P network 110 may also perform the operations of FIG. 4A (and may also be considered as candidates for the selection of the GO).

The first wireless device WD1 determines a first count value indicating how many of the other wireless devices WD2-WD4 are within wireless communication range of wireless device WD1 (402). Then, the first wireless device WD1 determines, for one or more second wireless devices WD2-WD4, one or more second count values each indicating how many other wireless devices are within wireless communication range of a respective one of the one or more second wireless devices WD2-WD4 (404). As mentioned above, the first wireless device WD1 may receive, from the one or more second wireless devices WD2-WD4, information indicative of the one or more second count values.

Then, the first wireless device WD1 selects either the first wireless device WD1 or one of the one or more second wireless devices WD2-WD4 as a group owner of a peer-to-peer network 110 based, at least in part, on whether the first count value is greater or less than the one or more second count values (406). For example, if the first count value is greater than the second count values, then the first wireless device WD1 is selected as the GO (406A). Conversely, if the first count value is less than one or more of the second count values, then the second wireless device WD2 having the highest second count value is selected as the GO (406B). When the first count value is equal to the greatest of the second count values, then the GO may be selected based on a comparison of the MAC addresses of the wireless devices having the same highest count value (406C).

Figure 4B:
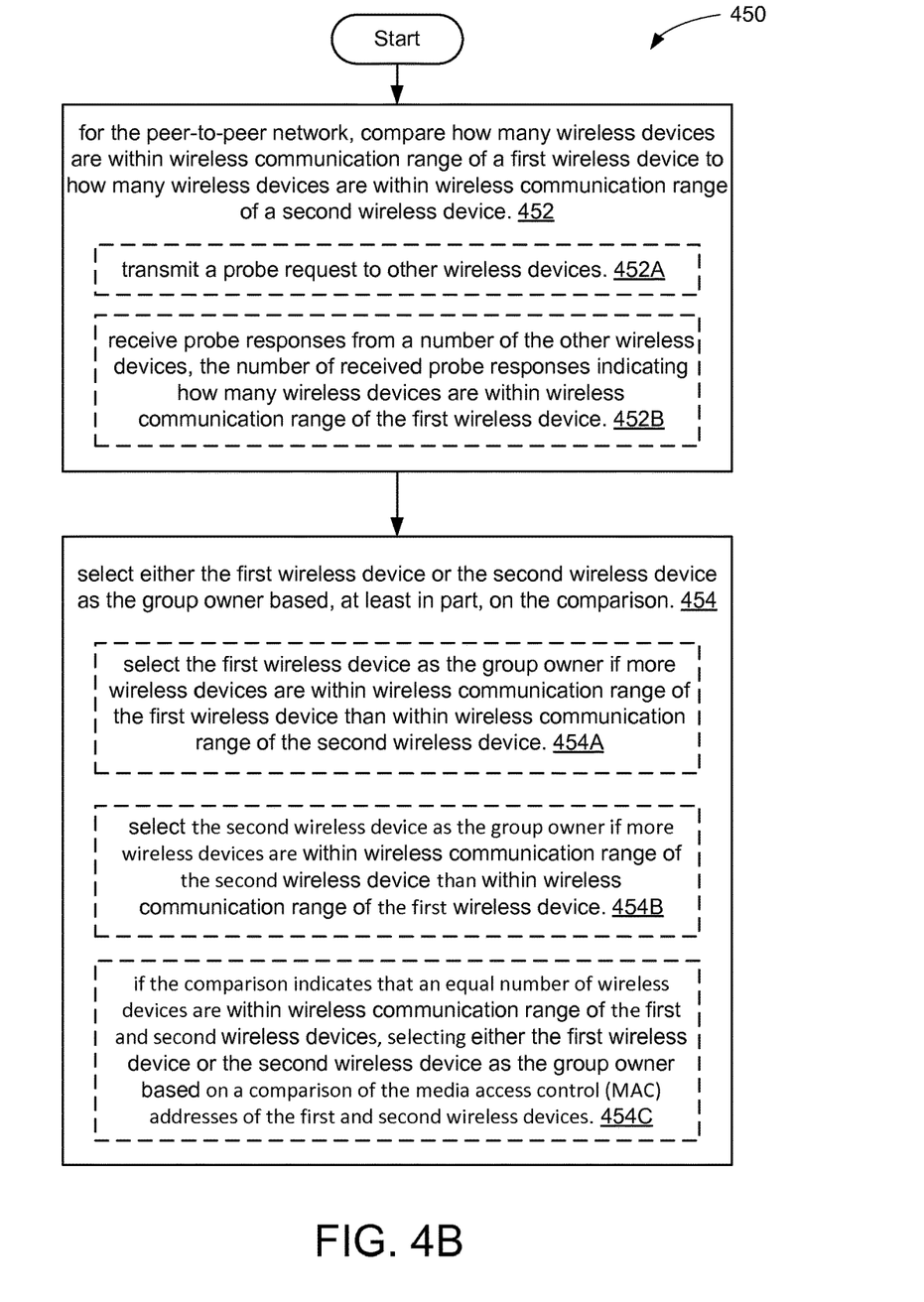
FIG. 4B shows an illustrative flow chart depicting another example operation for selecting a group owner for a P2P network, in accordance with example embodiments.

FIG. 4B shows an illustrative flow chart depicting a more detailed operation 450 for selecting the GO for P2P network 110, in accordance with another example embodiment. Some embodiments may perform the operations described herein with additional operations, fewer operations, operations in a different order, operations in parallel, and/or some operations differently. Further, although the operations of FIG. 4B are described below with respect to wireless device WD1 for simplicity, other wireless devices associated with P2P network 110 may also perform the operations of FIG. 4B (and may also be considered as candidates for the selection of the GO).

For the peer-to-peer network, how many wireless devices are within wireless communication range of a first wireless device are compared to how many wireless devices are within wireless communication range of a second wireless device (452). For at least some embodiments, the first wireless device may transmit a probe request to other wireless devices (452A), and may receive probe responses from a number of the other wireless devices, the number of received probe responses indicating how many wireless devices are within wireless communication range of the first wireless device (452B).

Next, either the first wireless device or the second wireless device may be selected as the group owner based, at least in part, on the comparison (454). For at least some embodiments, the first wireless device may be selected as the group owner if more wireless devices are within wireless communication range of the first wireless device than within wireless communication range of the second wireless device (454A), and the second wireless device may be selected as the group owner if more wireless devices are within wireless communication range of the second wireless device than within wireless communication range of the first wireless device (454B). If the comparison indicates that an equal number of wireless devices are within wireless communication range of the first and second wireless devices, either the first wireless device or the second wireless device may be selected as the group owner based on a comparison of the media access control (MAC) addresses of the first and second wireless devices (454C). For some embodiments, the wireless device having the higher numerical MAC address may be selected as the group owner. For other embodiments, the wireless device having the lowest numerical MAC address may be selected as the group owner.

By selecting the GO based, at least in part, on which of the wireless devices is within wireless range of the most number of other wireless devices that will form the P2P group, the example embodiments may ensure that the selected GO will be able to communicate with the most number of wireless device s in the group. This is at least one of the technical solutions to the aforementioned at least one technical problem.

Communications within P2P network 110 may cease when the GO is powered down, placed in a low-power mode or moved from communication range of the P2P network 110. In some embodiments, inactivity associated with a current GO may be detected and a new GO selected to restore communications. Selection of the new GO is described in more detail below in conjunction with FIG. 5.

Figure 5:
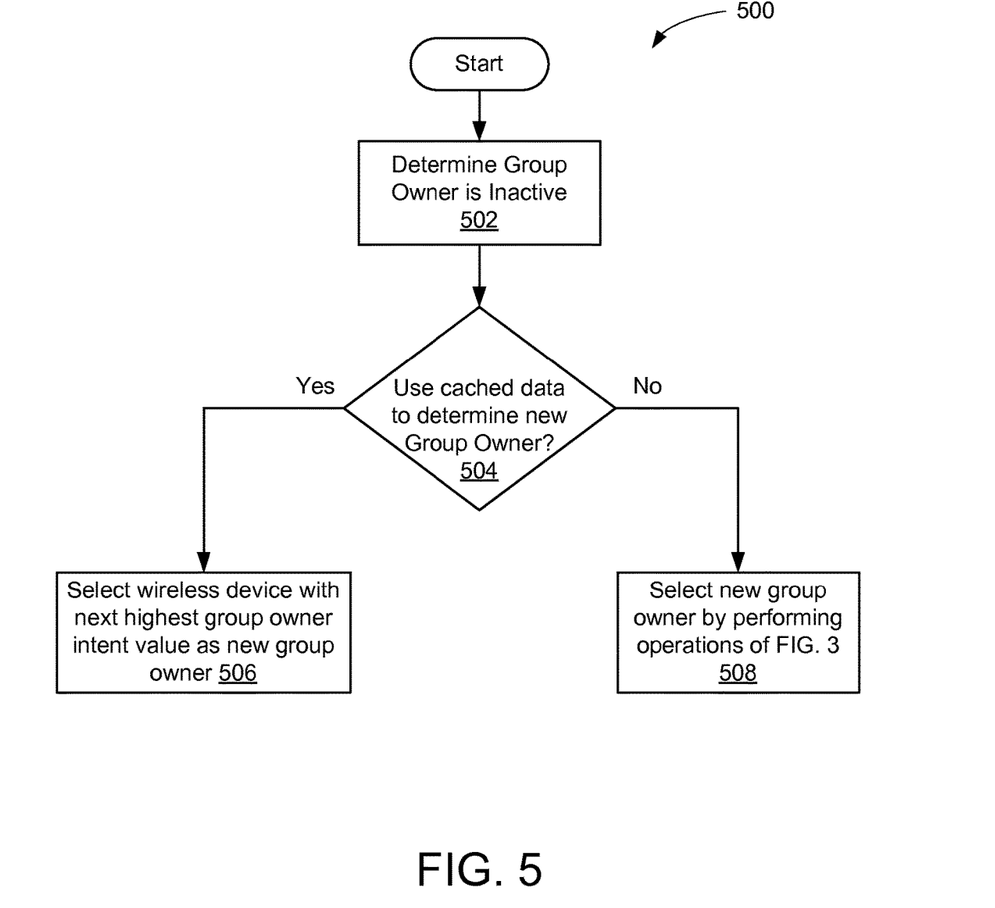
FIG. 5 shows an illustrative flow chart depicting an example operation for selecting a new group owner of a P2P network, in accordance with example embodiments.

FIG. 5 shows an illustrative flow chart depicting an example operation 500 for selecting a new GO for P2P network 110, in accordance with some embodiments. Referring also to FIG. 2, wireless device 200 may first determine that the GO is inactive (502). For one embodiment, wireless device 200 may determine that the GO is inactive based on wireless device 200 not receiving beacon frames from the GO. For example, wireless device 200 may conclude that the GO is inactive when no beacon frames are received from the GO during a period of ten seconds (although other suitable time periods may be used). For another embodiment, wireless device 200 may determine that the GO is inactive based on wireless device 200 not receiving a specified number of consecutive beacon frames from the GO. For example, wireless device 200 may conclude that the GO is inactive when ten consecutive beacon frames are not received (although other numbers of missing beacon frames may be used).

Next, wireless device 200 determines whether to use cached data to determine a new GO (504). Cached data may include the MAC addresses stored in device database 242, the count values or numbers stored in the group owner candidate table 243, and/or the group owner intent values stored in the group owner candidate table 243. If wireless device 200 using cached data to select the new GO, then the wireless device having the next highest count value or group owner intent value is selected as the new group owner (506). Conversely, if wireless device 200 does not use its cached data (as tested at 504), then the new GO may be selected by performing one or more operations described above with respect to FIG. 4A and/or FIG. 4B (508).

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of selecting a group owner of a peer-to-peer network, the method comprising:
   transmitting, by a first wireless device, a Wi-Fi probe request to other wireless devices;
   receiving, by the first wireless device, a number of Wi-Fi probe responses from other wireless devices, the number of received Wi-Fi probe responses indicating how many wireless devices are within wireless communication range of the first wireless device;
   comparing, in response to the receiving of the number of Wi-Fi probe responses by the first wireless device, how many wireless devices are within wireless communication range of the first wireless device to how many wireless devices are within wireless communication range of a second wireless device, wherein the first wireless device and the second wireless device are not group owners of a peer-to-peer network;
   selecting, in response to the comparing by the first wireless device, the first wireless device as the group owner if more wireless devices are within wireless communication range of the first wireless device than within wireless communication range of the second wireless device; and
   selecting, in response to the comparing by the first wireless device, the second wireless device as the group owner if more wireless devices are within wireless communication range of the second wireless device than within wireless communication range of the first wireless device.

2. The method of claim 1, wherein the first wireless device receives an indication of how many wireless devices are within wireless communication range of the second wireless device during a discovery operation.

3. The method of claim 1, wherein each of the received probe responses includes a media access control (MAC) address of a corresponding other wireless device.

4. The method of claim 3, further comprising:
   storing the MAC addresses in a database provided within the first wireless device.

5. The method of claim 1, further comprising:
   sending, to the second wireless device, an indication of how many wireless devices are within wireless communication range of the first wireless device.

6. The method of claim 1, further comprising:
   selecting either the first wireless device or the second wireless device as the group owner based on a comparison of media access control (MAC) addresses of the first and second wireless devices in accordance with a comparison by the first wireless device indicating that an equal number of wireless devices are within wireless communication range of the first and second wireless devices.

7. A first wireless device, comprising:
   one or more processors; and
   a memory storing instructions that, when executed by the one or more processors, causes the first wireless device to:
      transmit a Wi-Fi probe request to other wireless devices;
      receive a number of Wi-Fi probe responses from other wireless devices, the number of received Wi-Fi probe responses indicating how many wireless devices are within wireless communication range of the first wireless device;
      compare, in response to the reception of the number of Wi-Fi probe responses, how many wireless devices are within wireless communication range of the first wireless device to how many wireless devices are within wireless communication range of a second wireless device, wherein the first wireless device and the second wireless device are not group owners of a peer-to-peer network;
      select, in response to the comparison by the first wireless device, the first wireless device as the group owner if more wireless devices are within wireless communication range of the first wireless device than within wireless communication range of the second wireless device; and
      select, in response to the comparison by the first wireless device, the second wireless device as the group owner if more wireless devices are within wireless communication range of the second wireless device than within wireless communication range of the first wireless device.

8. The first wireless device of claim 7, wherein the first wireless device receives an indication of how many wireless devices are within wireless communication range of the second wireless device during a discovery operation.

9. The first wireless device of claim 7, wherein each of the received probe responses includes a media access control (MAC) address of a corresponding other wireless device.

10. The first wireless device of claim 9, wherein execution of the instructions causes the first wireless device to further:
    store the MAC addresses in a database provided within the first wireless device.

11. The first wireless device of claim 7, wherein execution of the instructions causes the first wireless device to further:
    send, to the second wireless device, an indication of how many wireless devices are within wireless communication range of the first wireless device.

12. The first wireless device of claim 7, wherein execution of the instructions to select the group owner causes the first wireless device to:
    select either the first wireless device or the second wireless device as the group owner based on a comparison of media access control (MAC) addresses of the first and second wireless devices in accordance with a comparison indicating that an equal number of wireless devices are within wireless communication range of the first and second wireless devices.

13. A non-transitory computer-readable medium storing instructions that, when executed by one or more processors of a first wireless device, causes the first wireless device to perform operations comprising:
   transmitting, by a first wireless device, a Wi-Fi probe request to other wireless devices;
   receiving a number of Wi-Fi probe responses from other wireless devices, the number of received Wi-Fi probe responses indicating how many wireless devices are within wireless communication range of the first wireless device;
   comparing, in response to the receiving of the number of Wi-Fi probe responses, how many wireless devices are within wireless communication range of the first wireless device to how many wireless devices are within wireless communication range of a second wireless device, wherein the first wireless device and the second wireless device are not group owners of a peer-to-peer network;
   selecting, in response to the comparing, the first wireless device as the group owner if more wireless devices are within wireless communication range of the first wireless device than within wireless communication range of the second wireless device; and selecting, in response to the comparing, the second wireless device as the group owner if more wireless devices are within wireless communication range of the second wireless device than within wireless communication range of the first wireless device.

14. The non-transitory computer-readable medium of claim 13, wherein the first wireless device receives an indication of how many wireless devices are within wireless communication range of the second wireless device during a discovery operation.

15. The non-transitory computer-readable medium of claim 13, wherein each of the received probe responses includes a media access control (MAC) address of a corresponding other wireless device.

16. The non-transitory computer-readable medium of claim 15, wherein execution of the instructions causes the first wireless device to perform operations further comprising:

storing the MAC addresses in a database provided within the first wireless device.

17. The non-transitory computer-readable medium of claim 13, wherein execution of the instructions causes the first wireless device to perform operations further comprising:

sending, to the second wireless device, an indication of how many wireless devices are within wireless communication range of the first wireless device.

18. The non-transitory computer-readable medium of claim 13, wherein execution of the instructions to select the group owner causes the first wireless device to perform operations comprising:

selecting either the first wireless device or the second wireless device as the group owner based on a comparison of media access control (MAC) addresses of the first and second wireless devices in accordance with a comparison indicating that an equal number of wireless devices are within wireless communication range of the first and second wireless devices.

19. A first wireless device, comprising:

means for transmitting a Wi-Fi probe request to other wireless devices;

means for receiving a number of Wi-Fi probe responses from other wireless devices, the number of received Wi-Fi probe responses indicating how many wireless devices are within wireless communication range of the first wireless device; and means for:

comparing, in response to the receiving of the number of Wi-Fi probe responses, how many wireless devices are within wireless communication range of the first wireless device to how many wireless devices are within wireless communication range of a second wireless device, wherein the first wireless device and the second wireless device are not group owners of a peer-to-peer network, selecting, in response to the comparing by the first wireless device, the first wireless device as the group owner if more wireless devices are within wireless communication range of the first wireless device than within wireless communication range of the second wireless device, and selecting, in response to the comparing by the first wireless device, the second wireless device as the group owner if more wireless devices are within wireless communication range of the second wireless device than within wireless communication range of the first wireless device.

20. The first wireless device of claim 19, wherein the first wireless device receives an indication of how many wireless devices are within wireless communication range of the second wireless device during a discovery operation.

21. The first wireless device of claim 19, wherein each of the received probe responses includes a media access control (MAC) address of a corresponding other wireless device.

22. The first wireless device of claim 19, further comprising:

means for sending, to the second wireless device, an indication of how many wireless devices are within wireless communication range of the first wireless device.

23. The first wireless device of claim 19, further comprising:

means for selecting either the first wireless device or the second wireless device as the group owner based on a comparison of media access control (MAC) addresses of the first and second wireless devices in accordance with a comparison indicating that an equal number of wireless devices are within wireless communication range of the first and second wireless devices.

* * * * *